United States Patent [19]

Hendriks

[11] Patent Number: 5,453,014

[45] Date of Patent: Sep. 26, 1995

[54] DYNAMIC LANGUAGE TRAINING SYSTEM

[76] Inventor: Helga M. L. Hendriks, 640 San Elijo St., San Diego, Calif. 92106

[21] Appl. No.: 814,244

[22] Filed: Dec. 23, 1991

Related U.S. Application Data

[63] Continuation of Ser. No. 424,716, Oct. 20, 1989, abandoned.

[51] Int. Cl.$^6$ ........................................... G09B 1/36
[52] U.S. Cl. ................................................ 434/171
[58] Field of Search ........................... 434/156, 167, 434/169, 170, 171, 172, 173, 236, 308, 314, 322, 323; 364/410

[56] References Cited

U.S. PATENT DOCUMENTS

| | | |
|---|---|---|
| 1,439,551 | 12/1922 | Hyland . |
| 2,520,649 | 8/1950 | Northrop ............................... 434/171 |
| 3,235,976 | 2/1966 | Elliott et al. ............................ 434/170 |
| 3,389,480 | 6/1968 | Holland ............................. 434/170 X |
| 3,871,115 | 3/1975 | Glass et al. . |
| 4,044,476 | 8/1977 | Marsh ................................... 434/171 |
| 4,613,309 | 9/1986 | McCloskey ............................ 434/170 |

FOREIGN PATENT DOCUMENTS

| | | |
|---|---|---|
| 939870 | 1/1947 | France . |
| 1157255 | 8/1956 | France . |
| 2318302 | 4/1972 | Germany . |
| 220512 | 7/1942 | Switzerland . |

OTHER PUBLICATIONS

H. Hendriks, *Instant Language Chart—Learn German Through Composition*, 1977.
H. Hendriks, *Instant Language Chart—Learn Spanish Through Composition*, 1980.
H. Hendriks, *Leonhardt Language System, Spanish*. 1980.

*Primary Examiner*—J. Bahr
*Attorney, Agent, or Firm*—Knobbe, Martens, Olson & Bear

[57] ABSTRACT

An educational dynamic method of teaching language is disclosed wherein a set of general categories of shapes represents all the parts of speech of natural human language. Animated changes in form and dynamic interaction within and between the categories of shapes represent symbolically the actions performed on or by each part of speech. A structural framework space provides the boundaries for arrangement and movement of the shapes; the framework space is defined by the rules of the given language. Each shape has its own structure which logically represents the complements of the given part of speech. Different colors within each category of shapes represent subcategories of the corresponding part of speech. Shapes, shape changes, and dynamic interaction within and between the shapes, represent the words, expression, and action whether it be voluntary, involuntary, active or inactive. Each shape has a structure of its own which contains all the words answering to the class or part of speech represented by that shape. The method may be taught in lecture or viewable form, or used interactively with the user controlling the animated movement within the limiting boundaries of the framework.

13 Claims, 4 Drawing Sheets

Rover eats chocolate and cookies.

Conjunction

The little dog is my friend.

Rover barks loudly.

DYNAMIC LANGUAGE TRAINING SYSTEM

This application is a continuation of application Ser. No. 07/424,716, filed Oct. 20, 1989 now abandoned.

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise rescues all copyright rights whatsoever.

BACKGROUND OF THE INVENTION

This invention relates to improvements in language training methods, wherein the improved method can be used to teach language understanding by utilizing dynamic interaction between colored shapes which represent symbolically each part of speech of natural human languages.

Educational environments are constantly in search of effective and efficient ways to teach language. Most students reluctantly struggle through the required courses to learn their own language. Learning another language is usually seen as unconquerable. Therefore, a new method for understanding and acquiring proficiency in any language is desirable. Especially desirable would be a language training system which could represent every word and every sentence in every language. It is also desirable that the method be amenable to all ages and educational levels, technical and conversational speech, work, school, home, initial basics of a new language, and more advanced communication skills. The present invention provides an educational tool that uses a majority of the senses (e.g., sight, sound, touch, etc.), presents rules in dynamic graphic form, teaches concepts not memorization, promotes faster learning, and is versatile and adaptable so it may be used for any language and any age group. The present invention provides a method of teaching complete understanding and comprehension of any language, including dead languages (such as Latin) or language history (such as the evolution from old English to modern English).

References such as U.S. Pat. No. 4,478,582 by Ruth L. Tucker, and U.S. Pat. No. 4,613,309 by Emily A. McCloskey, describe systems which utilize fixed, colored shapes which interrelate with one another so that the user may fit the partially related or interlocking pieces together to form proper sentences. McCloskey, for instance, discloses puzzle like shapes with symbols printed. The combination of puzzle pieces with symbols suggests proper arrangement of the parts of speech in order to form proper sentences. McCloskey claims to improve upon previous systems by allowing construction of generally unlimited sentence patterns and unlimited vocabulary. The previous puzzle and frame methods were inherently limited in this aspect.

References such as McCloskey are directed to overcoming the problem of students' inability to understand how each part of speech in a language relates to the other parts of speech by providing numerous speech elements and dividing them into color coded sets. However, simply aligning the proper parts of speech in an expression will not necessarily help the student conceptualize exactly how each part of speech acts or is acted upon. The student may see and understand the layout, but may not understand the layout's significance. For instance, placing a verb after a noun in the McCloskey model suggests nothing about how the verb acts upon the noun or how the noun is acting.

Thus, there is a deficiency in the prior art with respect to visual methods and apparatus of language instruction.

SUMMARY OF THE INVENTION

The present invention involves a language training method which utilizes shapes and colors which interact dynamically to logically suggest the natural interrelationships between the parts of human language. The dynamic interaction involves animated motion by the various colored shapes, wherein some shapes actually change form and shape, depending on the context of the sentence, and wherein some shapes simply move in relation to the other shapes to suggest the structure and the substantive content of the sentence. For instance, an adjective shape can orbit a noun shape to represent the adjective's modification of the noun. In addition, to signify access to a word contained within a noun shape, a drawer-like portion containing the word would extend from the noun shape, thereby releasing the word from within the structure. This motion, which may or may not be accompanied by instructive sounds, indicates that the word which is released from the drawer is a noun and that it falls within the subcategory of nouns which is associated with that particular drawer-like portion.

The system is dynamic internally in that many animated movements and shape changes are predetermined consistent with the rules of construction of the chosen language. Moreover, in an interactive implementation, the system is dynamic via a user who may control the animation of the shapes within the boundaries defined consistent with the language's rules of construction.

The use of the animated dynamic interaction within and between the colored shapes or images suggests to the student how proper sentences are formed, how the parts of speech or parts of the human language logically act or are acted upon, and how the parts of speech interact and interrelate with each other in natural human languages. The animated dynamic interaction within and between the shapes represents a new concept which is significantly helpful in teaching a complete understanding of any language at any learning level.

This dynamic language training method should provide an interesting teaching method to teach grammar, syntax, sentence structure, vocabulary, semantics, phonology and writing of the chosen language.

The dynamic language training system disclosed comprises the steps of defining general categories of shapes to represent all parts of natural human language, wherein each shape contains within it all words applicable to the level of the language being taught; defining logical colors corresponding to the categories of shapes, each color representing a specific subcategory of the part of speech represented by the shape; defining animated dynamic interaction within and between the categories of shapes that represents symbolically the actions performed on or by each part of speech, wherein the dynamic interaction includes animated movement of, and changes in form by, the shapes to represent logically the natural interaction between the parts of speech, and to suggest the proper structure and substance of the sentence, expression, or word; defining a structural framework to provide the boundaries for the possible arrangements of the shapes, wherein the movements will also be confined within the boundaries; and defining a structure of each shape to logically represent the compliments to the given parts of speech.

The general categories of parts of speech represented by the shapes consist of nouns, verbs, adverbs, adjectives, pronouns, prepositions, interjections and conjunctions; each category has a logical shape and structure, and each subcategory of each category of shape is represented and differentiated by a logically assigned color. For instance, a noun shape that functions as a subject would be one color, and a noun shape that represents a direct object would be a different color.

In the present invention, the logical shapes are animated so that the shapes change in form and move in relation to each other in a manner which suggests the logical dynamic interaction of parts of speech, be it voluntary, involuntary, active or inactive.

Therefore, this animated dynamic interaction within and between the shapes of the present invention will help students overcome their inability to understand how each part of speech in a given language relates to the other parts of speech. Each student will also easily understand and conceptualize the relationships between the parts of speech and their subcategories.

In the present invention, each part of speech has its own shape and its own structure. For instance, a shape from the noun category has a structure including a base which represents pronouns which may replace the noun when the noun shape is animated. With animation, the base will move upwardly to cover the entire noun shape, suggesting the natural noun replacement function of the pronoun. The noun structures also have a head piece which represents limiting adjectives, or gender in some languages. The noun shape structure may also contain a side section or protruding extension section which represents all prepositions which relate to the nouns within that structure.

The shape of any given noun may also change somewhat to represent the type of noun and the noun's action or the action taking place upon the noun. For instance, the shape will change if the noun is willfully active, if the noun is simply restful, if the noun is processing or involuntarily performing action, or if the noun is in a state of being. The way the verbs are animated, act, or interact with or upon nouns and other parts of speech suggests the type of verb properly used in the sentence. The other parts of speech also have logical structures and are animated to suggest the type of action or inaction that the part plays in any sentence, and the interrelationships with other parts of speech.

The animated dynamic interaction uniquely contributes to the understanding and conceptualization of proper sentence structure and total language understanding. Moreover, since each structure theoretically contains within it all words appropriate for the langauge, level, and application being taught, the possible construction of sentence patterns is limitless. Furthermore, the use of this method is amenable to non-interactive viewing or teaching, as well as completely interactive user involvement.

Thus, this invention provides a new and improved method and apparatus for teaching any natural human language. It can be used easily and efficiently to properly teach the principles of full language understanding. Being an object-oriented language, the present invention is also useful in the field of translation from one language to another. The spatial organization of the vocabularies on the object framework makes it easier to transpose words from one language to another, in order to reduce translation errors. For example, the word "open" has many functions in the English language which could present problems for translation into foreign languages. However, with the present invention, the term is also illustrated in an object framework as a noun shape, verb shape, or adjective shape. Each portion in the sentence framework marks it for distinct operation and understanding.

In its broadest form, the present invention can even become a language unto itself, in the sense that the various objects and their relative motion convey meaning and information, apart from any particular language.

DESCRIPTION OF THE PREFERRED EMBODIMENT

Figure 1:
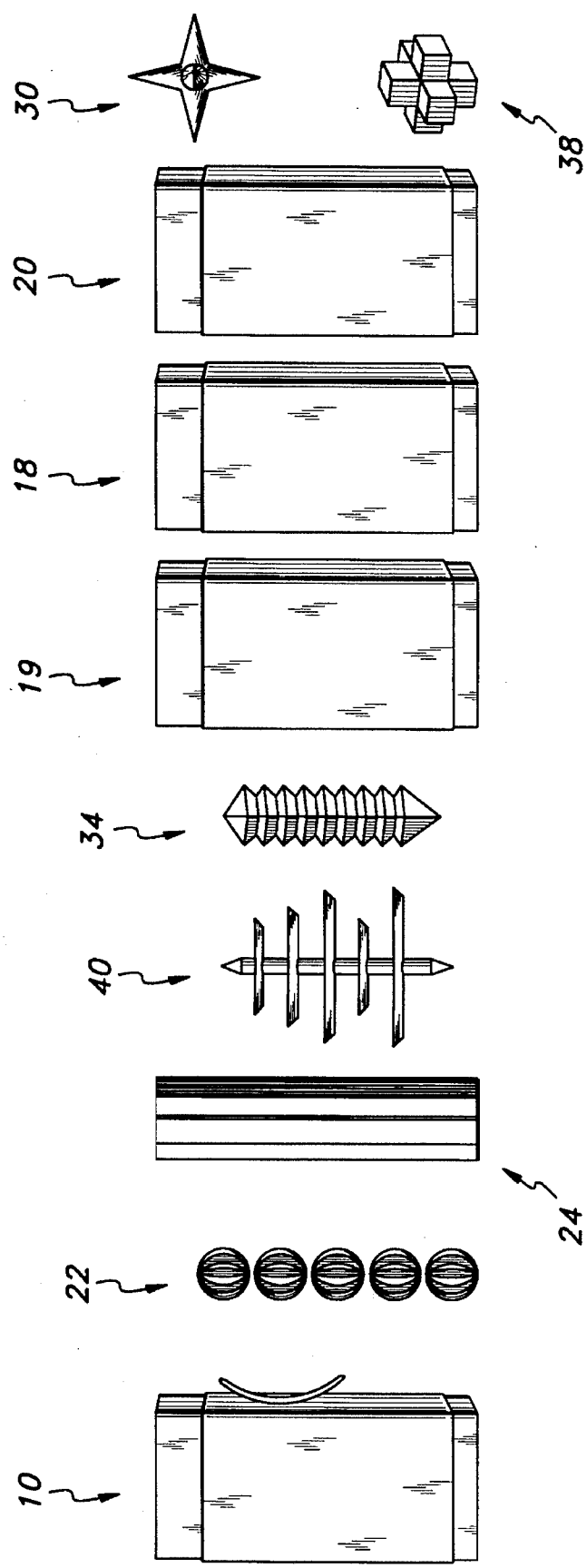
FIG. 1 is a representative view of the preferred shape and structure assigned to the general categories of parts of speech according to the present invention.

For simplicity, only some of the basic embodiments and use of the present invention will be described. It should be understood that the present invention can be utilized with any language and that only a few representative samples are necessary to illustrate the principles of the invention. In addition, the figures showing in the drawings are, of course, static. In use, these examples would include animated dynamic interaction in representing expressions.

FIG. 1 portrays a suggested set of shapes of the present invention representing each of the major categories of the English parts of speech. Other shapes are possible. The rectangular objects 10,18 represent nouns; the spherical objects 22 represent verbs; the column shape 24 also represents verbs; the star shaped object 30 represents interjections; the satellite shaped object 34 represents adjectives; the three-dimensional "plus-sign" shape 38 represents conjunctions; and the adverb shape 40 represents adverbs.

These general categories of shapes represent each of the parts of speech; assigning separate colors within these categories represents the related subcategories within these parts of speech. For instance, some exemplary English subcategories of nouns would be nominative nouns (commonly referred to as subjects), dative nouns (commonly referred to as indirect objects), accusative nouns (commonly referred to as direct objects) and genitive nouns (commonly referred to as possessive nouns). Ablative nouns and vocative nouns could also be represented, but these forms are no longer used in the English language. Other languages may have more or fewer subcategories. Each of these subcategories is assigned a distinct representative color.

Each structure, in essence, contains all the words which fall into the category represented by that structure and which meet the needs of the chosen language, level of language, and specific field being taught.

Figure 2:
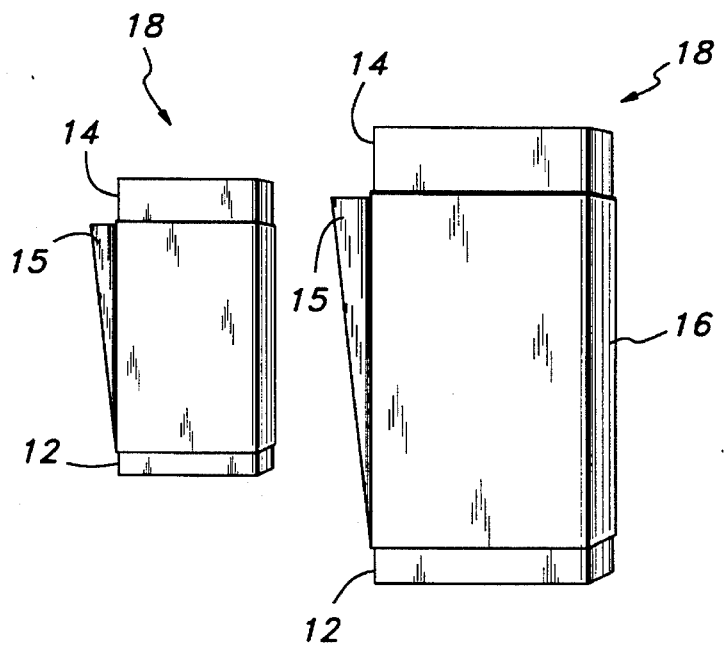
FIG. 2 depicts the specific structure of nouns in the present invention, with a headpiece representing limiting adjectives, a base representing pronouns, and a wing-like extension representing prepositions.

In a preferred embodiment, FIG. 2 shows the structure of the noun shape 18, with a base 12 representing pronouns which may replace the noun, and a with head piece 14 representing limiting adjectives which logically limit the use of the noun or which can represent gender in many languages. With animation, if a pronoun is used in place of a noun, the base 12 will move to cover or encompass the noun shape 18. This represents the logical replacement role of the pronoun. The wing-like structure 15 which can extend from the side of the noun shape 18 represents prepositions which relate to the noun. The arrangement in FIG. 2 could represent a phrase such as "in the book." The wing-like extension 15 represents "in." The headpiece 14 represents the limiting adjective "the." The center 16 of the noun shape 18 provides the word "book."

Figure 3:
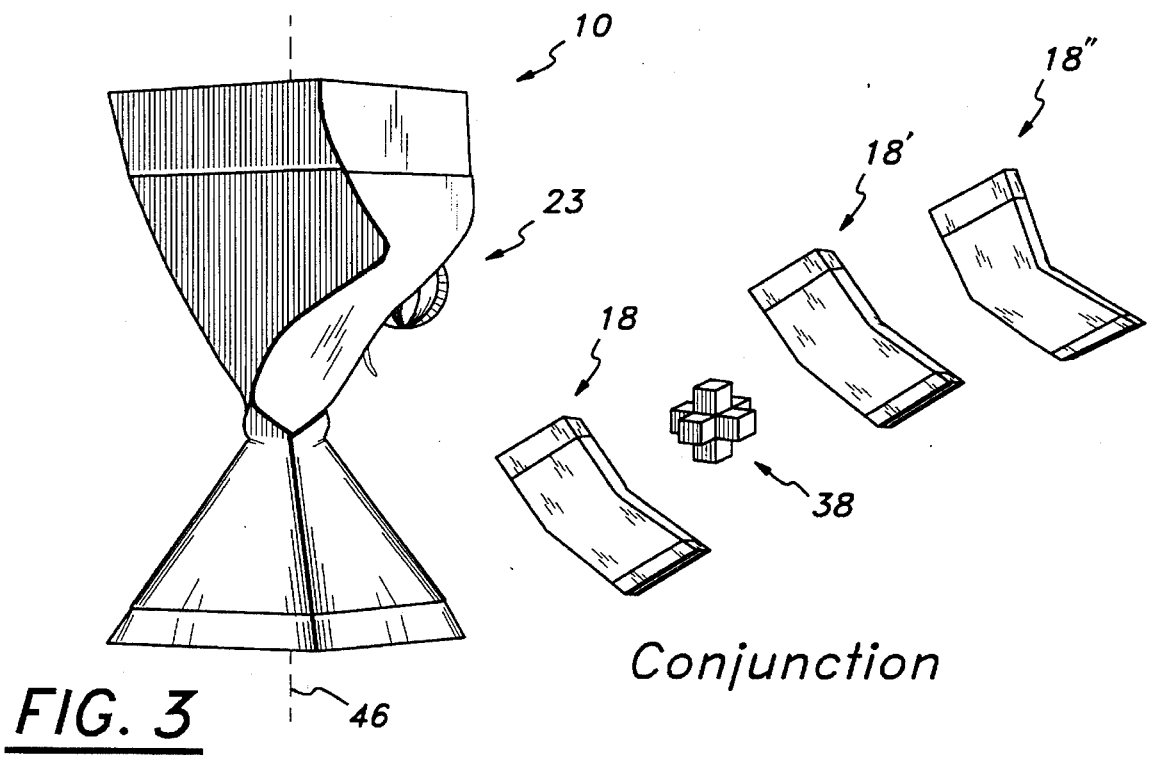
FIG. 3 portrays a static example of the use of the invention to represent a simple sentence consisting of a subject, verb, object singular conjunction and two direct objects (objects plural).

FIG. 3 depicts a simple sentence representation. the four rectangular columns 10,18,18',18" are noun shapes; one 10 is the subject and is one color; the three others 18,18', 18" are direct objects and are another color The sphere shaped verb 23 corresponds in color to the direct objects 18,18', 18" because the direct objects 18,18', 18" are acted upon. The plus sign shape 38, as a conjunction, joins a singular direct object 18 and two direct objects (plural) 18',18".

In a preferred embodiment, this arrangement could represent the sentence "Rover eats chocolate (18) and cookies (18', 18")." The first noun shape 10 represents the subject, "Rover." The sphere shaped verb 23 represents "eats", and the three other noun shapes 18,18',18" represent the direct objects "chocolate" and "cookies." The three dimensional plus shape 38 represents the conjunction "and."

Figure 4:
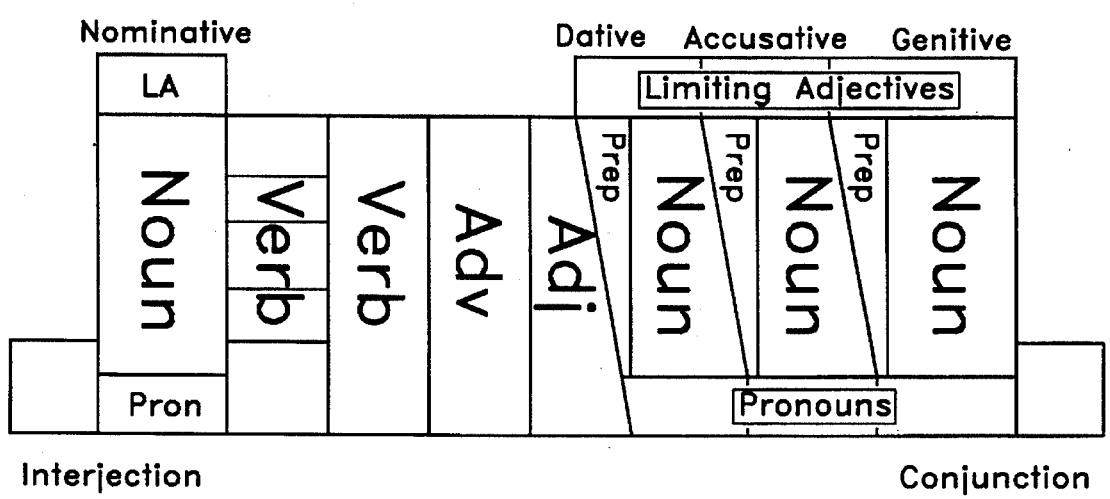
FIG. 4 depicts a possible framework space of the present invention defined by rules of the English language.

To form the sentence, the original layout of these figures must follow the framework 44 shown in FIG. 4. Accordingly, the verb sphere 23 must follow the noun shape 10 and precede the direct object shapes 18,18', 18". In the animated dynamic system, the verb "eats," as represented by the sphere 23, first moves toward and then attaches itself to the side of the noun shape 10, "Rover." The sphere's 23 movement represents the action which will take place. Because an active verb has attached itself to the noun shape 10, this noun shape 10, representing the subject, "Rover," will begin to twist along the noun shape's 10 axis 46. This twisting represents voluntary action by the subject, "Rover." First, the shape 10 will twist a partial revolution in one direction, then it will twist in the other direction. This twisting will continue, back and forth, as the subject, "Rover" continues to voluntarily act. The first noun shape 18 is a singular direct object in this animation will move toward the subject 10. It will bend to appear as if it is being pulled into the subject 10.

As the animated dynamics proceed, the first direct object shape 18, representing "chocolate," will move forward and finally merge into the subject shape 10 and then disappear. After the first direct object shape 18 merges into the subject shape 10, representing the fact that Rover has eaten the chocolate, the subject shape continues to twist The conjunction "and," represented by the three-dimensional "plus" shape 38, will fly into the subject and pull two direct object shapes 18',18" (which represent "cookies") These shapes 18', 18" will also bend as seen in FIG. 3 to appear as if they are being pulled into the subject 10. Both the three-dimensional plus shape 38 and the object shapes 18', 18" move toward and merge into the subject shape 10, representing that Rover has eaten the cookies.

As the animated dynamics proceed, the first direct object shape 18, representing "chocolate," will move toward and finally merge into the subject shape 10 and then disappear. After the first direct object shape 18 merges into the subject shape 10, representing that Rover has eaten the chocolate, the subject shape continues to twist, and the second direct object shape 18' will move toward and merge into the subject shape 10, representing that Rover has eaten the cookies. The conjunction, "and," represented by the three-dimensional plus shape 38, will move along between the direct object shapes 18,18', as seen in FIG. 3, to represent the connection role of the conjunction.

FIG. 4 shows an example of a framework space 44 of the present invention, defined by the grammatical rules of construction of the English language. The space is divided as depicted to suggest the proper positions for the various parts of speech in a standard sentence.

Figure 5:
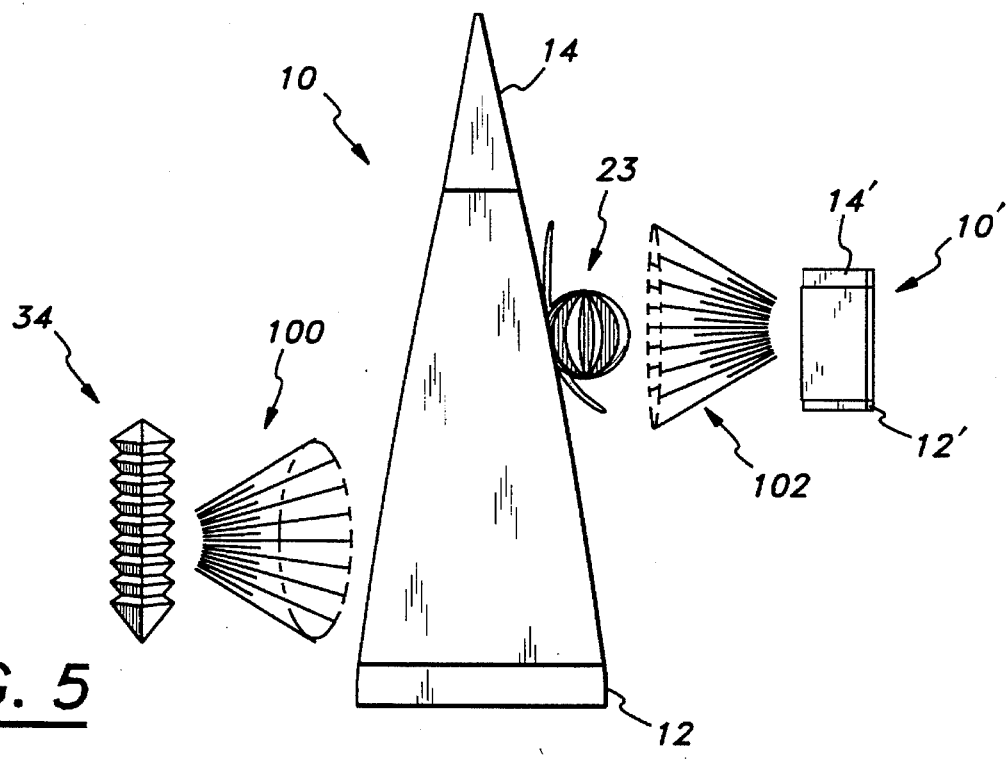
FIG. 5 shows the use of an adjective shape modifying a noun shape in a simple sentence according to the present invention.

FIG. 5 depicts the action of an adjective shape 34 upon the corresponding noun shape 10 in a simple sentence like "the little dog is my friend." The adjective shape 34 orbits the noun shape 10, and light 100 shines from the adjective shape 34 onto the noun shape 10, representing the adjective's description of the noun. To form the sentence the word "the" is represented by the headpiece 14; the adjective shape 34 represents "little;" the noun shape 10 represents "dog;" the sphere shape 23 represents "is;" the headpiece 14 represents "my"; and the noun shape 18 represents "friend."

Figure 6:
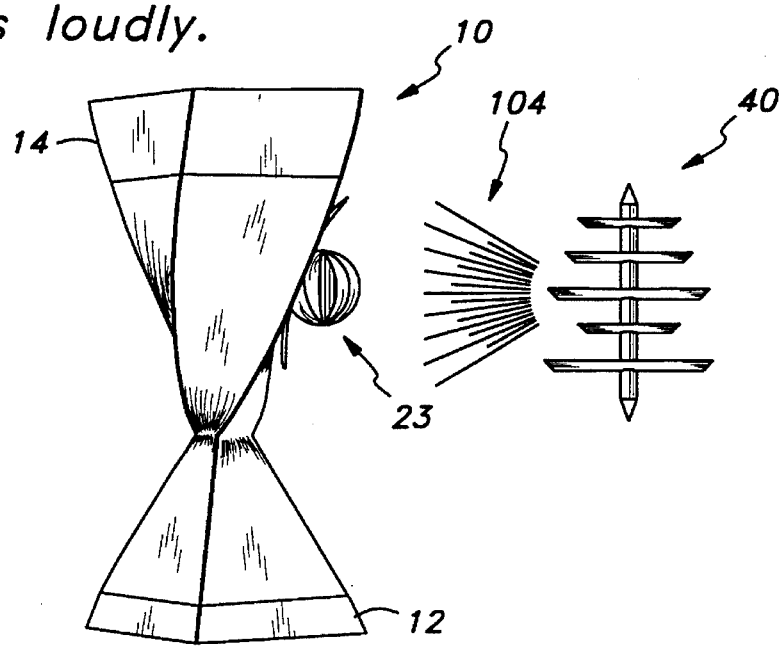
FIG. 6 shows the use of an adverb in a simple arrangement consistent with the present invention.

FIG. 6 depicts the use of an adverb shape 40 as it modifies the verb. The adverb shape 40 will orbit the connected noun 10 and verb 23 shapes. As the adverb shape 40 orbits, it will shine light on the sphere shaped verb 23 to represent its modification of the verb. A sentence represented in this scenario might be "Rover barks loudly."

The preceding embodiments demonstrate that the colored shapes and the animated dynamic interaction between the shapes inform the user or viewer about the significance of the various parts of speech in a sentence, and help the user to quickly understand proper use of the given language.

Consistent with the present invention, the animated dynamic movement and interaction between the categories and colors of different shapes, can represent any word, sentence, or expression in any language.

The embodiments described here are only exemplary of simple usage of the invention to realize simple expressions and sentences. Many other embodiments, representations, and animated dynamic interactions within and between the shapes are intended which include other features of the invention.

What is claimed is:

1. An educational method of teaching the interrelationships between the parts of a natural human language, comprising the steps of:

providing a plurality of structures of differing and unique geometrical shapes, each part of speech of said natural human language being represented by a different unique geometrical shape;

selecting a sentence having a plurality of words;

assigning an appropriate one of said structures to each word of said sentence;

arranging the structures which have been assigned to the words of the sentence in accordance with a predetermined grammatical pattern of said natural human language to form the sentence, said predetermined grammatical pattern defined by a framework of organization, said framework comprising positions indicating an appropriate location for each structure assigned to the words of the sentence; and displaying each word of the sentence during the educational method.

2. The method of claim 1, wherein a portion of each of said structures contains words which correspond to the part of speech represented by the structure.

3. The method of claim 1, wherein said parts of speech comprise nouns, verbs, adjectives, adverbs, interjections, conjunctions, pronouns and prepositions, or similarly corresponding parts of speech in said natural human language.

4. The method of claim 1, wherein each of said structures has subcategories represented by differing colors, each of said colors representing a subcategory within each of said parts of speech.

5. The method of claim 3, wherein the object of the shape representing said nouns is rectangular in shape and includes an integral base representing only pronouns, an integral headpiece representing appropriate limiting adjectives, and an integral optional protruding extension representing prepositions.

6. A system for teaching a language, comprising:

a plurality of geometrically-shaped objects, each object representing a part of speech of said language, wherein the geometrical shape of each object uniquely identifies the part of speech represented;

wherein at least one of said objects represents nouns, and wherein said object representing nouns is rectangular in shape and comprises an integral base representing only pronouns, an integral head piece representing appropriate limiting adjectives, and an optional integral protruding extension representing prepositions, said protruding extension extending from a side of the object representing nouns;

a sentence having a plurality of words, each word of said sentence associated with one of said objects; and a framework of organization defined by a predetermined grammatical pattern of said language, wherein the framework provides a pattern of arrangement for the geometrically-shaped objects, and wherein said framework comprises positions indicating an appropriate location for each object representing each part of speech in said predetermined grammatical pattern, each of said objects which has a word associated therewith, displaying said word during use of said system to teach a language.

7. An educational training system for teaching natural human language, said natural human language having grammar rules, said system comprising:

a plurality of differently- and geometrically-shaped objects, each object having a unique geometrical shape representing a different part of speech of said natural human language;

wherein at least one of said objects represents nouns, and wherein said object representing nouns is rectangular in shape and comprises an integral base representing only pronouns, and integral head piece representing appropriate limiting adjectives, and an optional integral protruding extension representing prepositions;

a sentence having a plurality of words, each word of said sentence associated with one of said objects; and an organizational framework defined by grammar rules of said natural human language and which defines the pattern for arrangement of said objects, and wherein said framework comprises positions indicating an appropriate location for the object representing each part of speech in said predetermined grammatical pattern, each of said objects which has a word associated therewith, displaying said word during use of said system to teach a language.

8. The method of claim 7, wherein the parts of speech comprise nouns, verbs, adjectives, adverbs, interjections, conjunctions, pronouns and prepositions.

9. An educational dynamic method of teaching the interrelationships and dynamic interaction between the parts of a natural human language;

providing a plurality of objects of differing and unique geometrical shapes, each different shape representing a different part of speech of said natural human language;

selecting a sentence having a plurality of words;

assigning an appropriate one of said objects to each word of said sentence;

arranging said objects which have been assigned to the words of the sentence according to a predetermined grammatical pattern of said natural human language;

causing said objects which have been assigned to the words of the sentence to undergo animated shape changes and animated movement that represent symbolically the actions performed on or by the parts of speech represented by the objects and the interactions between said parts of speech; and displaying each word of the sentence during the educational method.

10. The method of claim 9, wherein each of said objects has a different color, each of said colors representing a subcategory within the part of speech represent by said image.

11. An educational method of teaching a natural human language, comprising the steps of:

displaying a plurality of objects, each object having a unique and differing geometrical shape, and each part of speech of said natural human language being representing by an object of a unique and different shape from other of said parts of speech;

selecting a sentence having a plurality of words;

assigning an appropriate one of said objects to each word of said sentence;

arranging said objects which have been assigned to the words of the sentence in accordance with a predetermined grammatical pattern derived from the grammatical rules of said natural human language;

animating said objects to effect changes in shape and movement to represent the actions performed on or by the given parts of speech and the interactions between said parts of speech; and displaying each word of the sentence during the educational method.

12. The method of claim 11, further comprising the step of causing, through said animating, at least one of said objects to shine light on at lest one of said other images.

13. The method of claim 11, wherein the parts of speech comprise nouns, verbs, adjectives, adverbs, interjections, conjunctions, pronouns and prepositions, or similarly corresponding parts of speech in said natural human language.

* * * * *

UNITED STATES PATENT AND TRADEMARK OFFICE
CERTIFICATE OF CORRECTION

PATENT NO. : 5,453,014

DATED : September 26, 1995

INVENTOR(S) : Helga Fischer Leonhardt

It is certified that error appears in the above-identified patent and that said Letters Patent is hereby corrected as shown

```
Column 1, Line 10  "rescues" should be "reserves".
Column 5, Line 18  "color The" should be "color.  The".
Column 5, Line 54  "twist The" should be "twist.  The".
Column 8, Line 57  "lest" should be "least".
```

Signed and Sealed this

Twenty-sixth Day of March, 1996

Attest:

BRUCE LEHMAN

*Attesting Officer*     Commissioner of Patents and Trademarks